UNITED STATES PATENT OFFICE.

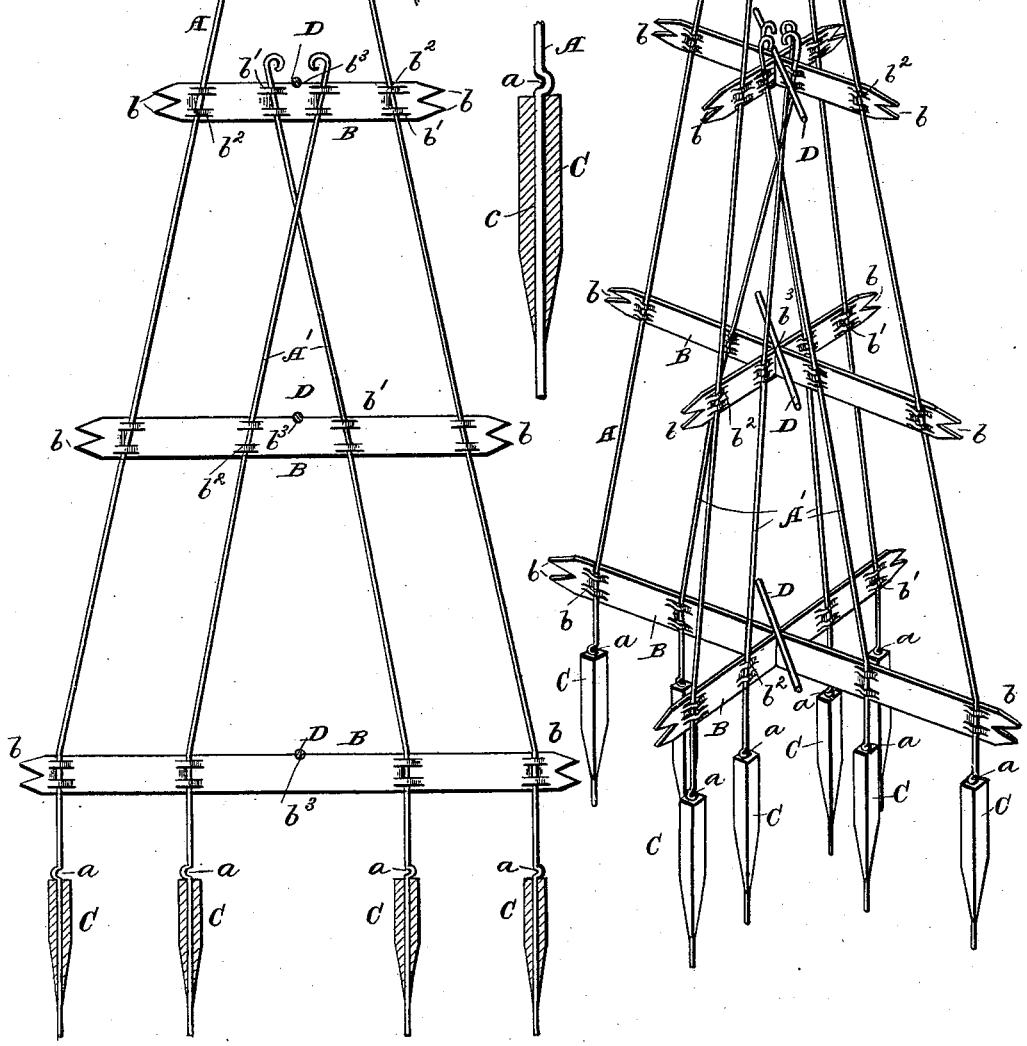

HENRY J. COE, OF CLEVELAND, OHIO.

FENCE-POST.

SPECIFICATION forming part of Letters Patent No. 524,018, dated August 7, 1894.

Application filed August 7, 1893. Serial No. 482,515. (No model.)

*To all whom it may concern:*

Be it known that I, HENRY J. COE, a citizen of the United States, and a resident of Cleveland, county of Cuyahoga, and State of Ohio, have invented certain new and useful Improvements in Fence-Posts, of which the following is a specification, the principle of the invention being herein explained and the best mode in which I have contemplated applying that principle, so as to distinguish it from other inventions.

The annexed drawings and the following description set forth in detail, one mechanical form embodying the invention; such detail construction being but one of various mechanical forms in which the principle of the invention may be used.

In said annexed drawings—Figure I represents a side elevation of my improved fence post; Fig. II, a perspective view of a corner post constructed in accordance with my invention; Fig. III, a sectional view of one of the cross strips, illustrating the manner of securing the longitudinal wires or rods of the fence, and Fig. IV, a sectional view, on an enlarged scale, of one of the base plugs and the lower end of one of the rods which form the fence post.

The fence post is a flat structure, placed at a right angle to the line of the fence, so as to support the latter against strain transverse to the line of the same. It consists essentially of two long converging rods, A A; two short converging rods, A' A'; and transverse strips, B, which connect said rods. The lower ends of the rods are vertical, and have bends, $a$, formed upon them, to form shoulders, which may bear against the upper ends of the base plugs C, which are preferably of earthenware or other strong and non-corrosive material. The base plugs are formed with axial bores, $c$, through which the lower ends of the rods pass, the bends $a$ bearing against the upper ends of the plugs and preventing the rods from passing farther down through the plugs. The ends of the rods project preferably beyond the lower ends of the base plugs, so as to gain additional anchorage in the ground and, if desired, to serve as points for the plugs in forcing the latter into the ground.

The cross strips B have their ends formed with sharp points, $b$, which will serve as barbs, and prevent cattle from leaning against the fence post and thus upset or break them. The cross strips are preferably formed with pairs of longitudinal slots, $b'$, forming loops, $b^2$, through which the inclined rods may pass,—said loops serving to retain the rods in their proper positions. Other means may, however, be employed for securing the cross strips and the rods together. The cross strips are formed with notches, $b^3$, at the middles of their upper edges, and the wires D, of the fence, rest in said notches, and are preferably bent to form nicks, $d$, which may ride in the notches, and prevent longitudinal displacement of said wires. If bars, boards, or rails are employed to form the longitudinal panels of the fence, such bars, boards, or rails, may be provided with corresponding nicks straddling the cross strips.

For use as corner posts or similar terminal posts, two posts like the above described post, may be built at right angles to each other, with the cross strips gained, one into the other, at their middles, as illustrated in Fig. II.

In practice, the fence posts may be set up in their complete shape, and the wires, bars, boards or rails, strung up afterward, or the posts may be built up, as the construction of the fence progresses,—one side of the post being first finished, whereupon the wires are put in place, and the other side of the post completed, inclosing the wires.

As the post stands transversely to the line of the fence, it is sufficiently braced to stand any strain transverse to the line of fence; and, on account of the manner of securing the longitudinal portions of the fence, the post will be braced longitudinally by said longitudinal portions.

The posts are not liable to be disturbed by either persons or cattle, on account of the sharp pointed ends of the cross strips, which will effectually prevent any leaning or rubbing against the posts, and the panels of the fence will be sufficiently braced by the posts to prevent their being affected by any ordinary usage to which the fence may be subjected.

It is not necessary to form the nicks in all of the wires of the fence, as one nick in one wire for each fence post may be sufficient to longitudinally brace the posts.

The base plugs will prevent corrosion of the lower ends of the rods of the posts, and will furthermore prevent the possibility of bending or displacing the lower ends of the rods of the post, when setting up the latter, as said plugs may first be driven into the ground, whereupon the rods may be inserted through their longitudinal bores. If desired the rods may be secured in the base plugs by solder or by a suitable cement,—zinc being desirable, if the base plugs are made of cast iron.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. In a fence post, the combination with rods arranged to incline toward each other in a vertical plane, of cross strips longitudinally slotted to form loops through which said rods pass,—said cross strips bearing with their faces against the rods and being held at their proper heights by the divergence of the rods while bracing the latter, substantially as set forth.

2. In a fence post, the combination with upright rods, of cross strips secured to brace said rods and having projecting barbed ends, substantially as set forth.

3. In a fence post, the combination with rods oppositely inclined toward each other in a vertical plane, of cross strips formed with barbed ends, and formed with pairs of slots which form loops through which the rods pass and in which the rods are secured, substantially as set forth.

4. In a fence post, the combination with a base plug formed with an axial bore extending throughout its entire length, of a metallic rod having its lower portion inserted through said bore to project beyond the lower end of the same and formed with a bend which bears against the upper end of the plug and serves as a shoulder to prevent the rod from slipping through the bore, substantially as set forth.

5. In a fence post, the combination of rods oppositely inclined toward each other in a vertical plane and formed with vertical lower portions having shoulders a distance from their ends, cross strips connecting and bracing said rods, and base plugs having axial bores through which the vertical lower portions of the rods are inserted and against the upper ends of which the shoulders of said rods bear, substantially as set forth.

6. In a fence post, the combination of horizontal cross strips supported in a plane transverse to the line of the fence, and longitudinal wires formed with nicks riding upon the upper edges of said cross strips, substantially as set forth.

7. In a fence post, the combination of horizontal cross strips supported in a vertical plane at right angles to the line of fence and formed with notches in their upper edges, and longitudinal wires formed with bent portions which may ride in said notches, substantially as set forth.

8. A fence post, consisting of rods oppositely inclined toward each other in a vertical plane, base plugs upon the lower ends of said rods, and cross strips formed with pairs of longitudinal slots to form loops through which the rods pass and by which they are secured, substantially as set forth.

9. In a fence post, the combination of rods oppositely inclined toward each other in vertical planes at an angle to each other, and horizontal cross strips having the rods secured to them and united at their middles, substantially as set forth.

In testimony that I claim the foregoing to be my invention I have hereunto set my hand this 3d day of August, A. D. 1893.

HENRY J. COE.

Witnesses:
 WM. SECHER,
 DAVID DAVIES.